United States Patent
Lo et al.

(10) Patent No.: US 10,515,182 B2
(45) Date of Patent: Dec. 24, 2019

(54) AUTO DETECTION OF SELECT POWER DOMAIN REGIONS IN A NESTED MULTI POWER DOMAIN DESIGN

(71) Applicant: ATI Technologies ULC, Markham (CA)

(72) Inventors: Elsie Lo, Thornhill (CA); Erhan Ergin, Austin, TX (US); Dipanjan Sengupta, Markham (CA); Rajit Seahra, Markham (CA); Sowmya Thikkavarapu, Hyderabad (IN); Kameswara Goutham Vankayalapati, Hyderabad (IN)

(73) Assignee: Advanced Micro Devices, Inc., Austin, TX (US)

( * ) Notice: Subject to any disclaimer, the term of this patent is extended or adjusted under 35 U.S.C. 154(b) by 266 days.

(21) Appl. No.: 15/639,992

(22) Filed: Jun. 30, 2017

(65) Prior Publication Data
US 2019/0004588 A1  Jan. 3, 2019

(51) Int. Cl.
*G06F 17/50* (2006.01)
*G06F 1/3296* (2019.01)
*G06F 1/3234* (2019.01)

(52) U.S. Cl.
CPC ........ *G06F 17/5081* (2013.01); *G06F 1/3296* (2013.01); *G06F 1/3243* (2013.01); *G06F 2217/78* (2013.01)

(58) Field of Classification Search
CPC ............. G06F 17/5081; G06F 2217/78; G06F 1/3296; G06F 1/3243
See application file for complete search history.

(56) References Cited

U.S. PATENT DOCUMENTS

| 6,282,693 | B1 | 8/2001 | Naylor et al. |
| 6,820,240 | B2* | 11/2004 | Bednar ............... G06F 17/5045 716/113 |
| 7,111,266 | B2* | 9/2006 | Correale, Jr. ....... G06F 17/5045 257/E27.105 |

(Continued)

OTHER PUBLICATIONS

A.B. Kahng and S. Reda, "Digital Layout-Placement", The CRC Handbook of EDA for IC Design, CRC Press, 2005, G. Martin and L. Lavagno (eds.), vol. 2, pp. 5-1-5-23.

*Primary Examiner* — Naum Levin
(74) *Attorney, Agent, or Firm* — Polansky & Associates, P.L.L.C.; Paul J. Polansky; Rosalynn M. Smith

(57) ABSTRACT

A non-transitory computer-readable medium includes instructions that, when provided to and executed by a processor, cause the processor to receive a first placement of domain instances of an integrated circuit layout provided as a tile having a group of multiple power domain modules. The first placement of domain instances is scanned to identify instances associated with a preselected power specification. A heuristic is applied to the first placement of domain instances to form an observation area. The heuristic demarcates select instances to form the observation area. Each instance associated with the preselected power specification is identified in the observation area. A contiguous region of instances is formed from the select instances in the observation area. The first placement of domain instances in the integrated circuit layout is modified to provided revised placement for instances associated with the contiguous region of instances.

20 Claims, 7 Drawing Sheets

(56) References Cited

U.S. PATENT DOCUMENTS

| | | | | |
|---|---|---|---|---|
| 7,739,629 B2* | 6/2010 | Wang | ............... | G06F 17/505 |
| | | | | 703/14 |
| 7,760,011 B2* | 7/2010 | Wang | ............... | G06F 17/5045 |
| | | | | 326/31 |
| 7,945,875 B2* | 5/2011 | Anand | ............... | G06F 17/5059 |
| | | | | 714/726 |
| 8,392,862 B1* | 3/2013 | Siguenza | ............... | G06F 17/505 |
| | | | | 716/120 |
| 8,607,177 B2* | 12/2013 | Verbeure | ............... | G06F 17/505 |
| | | | | 713/322 |
| 9,405,357 B2 | 8/2016 | Kosonocky et al. | | |
| 9,779,197 B1* | 10/2017 | Wagner | ............... | G06F 17/5068 |
| 9,792,397 B1* | 10/2017 | Nagaraja | ............... | G06F 17/504 |
| 10,083,269 B2* | 9/2018 | De Dood | ............... | G06F 17/5068 |
| 10,204,180 B1* | 2/2019 | Huang | ............... | G06F 17/5068 |
| 10,242,145 B1* | 3/2019 | Anand | ............... | G06F 17/5072 |
| 2007/0245281 A1* | 10/2007 | Riepe | ............... | G06F 17/5072 |
| | | | | 716/102 |
| 2007/0245285 A1* | 10/2007 | Wang | ............... | G06F 17/505 |
| | | | | 716/104 |

* cited by examiner

| | DEFAULT METHOD | DETECT REGION METHOD | CONCLUSION |
|---|---|---|---|
| AUTO DETECTION REGION RUN TIME (MIN) | 0 | 5 | |
| CLUSTER RUN TIME (MIN) | 31 | 25 | |
| NUMBER OF NATURALLY CLUSTERED | 81398 | 23952 | |
| SECOND SERIES OF CLUSTERING | 75326 | 38496 | |
| TOTAL CLUSTERED INSTANCES | 156724 | 62448 | REDUCED BY APPROX. 60% |
| CLUSTER CELLS MOVED | 99628 | 50238 | REDUCED BY APPROX. 50% |
| CLUSTER INSTANCE MAX MOVED | 68.076 | 21.69 | REDUCED BY APPROX. 70% |

FIG. 5

AUTO DETECTION OF SELECT POWER DOMAIN REGIONS IN A NESTED MULTI POWER DOMAIN DESIGN

BACKGROUND

Power management is an integral part of system-on-chip (SoC) design. Effective energy management for an SoC requires strategic planning at every processing stage, beginning at the architecture design stage. In a continuous effort to reduce power density, assimilating techniques to optimize low-power consumption in an integrated circuit is useful at every stage of the design. As technology moves towards more complex integrated circuit designs, for example, three-dimensional integrated circuit design, providing gated module layouts for multi-power domains becomes increasingly complex.

In a low-power SoC design, power-gated (on/off) and pre-gated (always on) logic can initially co-exist on an integrated circuit tile nested together in the same area. In this example, a default power supply rail is associated with the power-gated domain, and a secondary power supply rail is associated with the pre-gated power domain. The nested pre-gated power domain logic cells are primarily power control circuitry or feedthroughs. Electronic design automation (EDA) place-and-route tools place instances of logic circuitry in an integrated circuit design. However, typically, EDA place-and-route tools are not power grid aware. Instead, they place pre-gated domain instances at locations based on timing and congestion alone and tend to scatter them throughout the integrated circuit tile. Consequently, during legalization of an integrated circuit design layout the placement of pre-gated instances may result in a location that cannot be powered by the secondary rail.

Clustering is a method to assist the EDA place-and-route tool to route power to nested pre-gated logic instances. Clustering works well when small amounts of pre-gated logic are scattered across an integrated circuit tile. However, as the relative area of pre-gated domain logic increases with respect to the power-gated domain logic, this known clustering technique fails to allow the EDA place-and-route tool to satisfy routing requirements. For example, the existing clustering technique tends to create centralized power islands, and when a large number of cells are involved, the design may become unrouteable and the layout unusable.

BRIEF DESCRIPTION OF THE DRAWINGS

FIG. 5 illustrates a table depicting results for detecting contiguous cell regions based on the natural placement of domain instances according to some embodiments;

Figure 1:
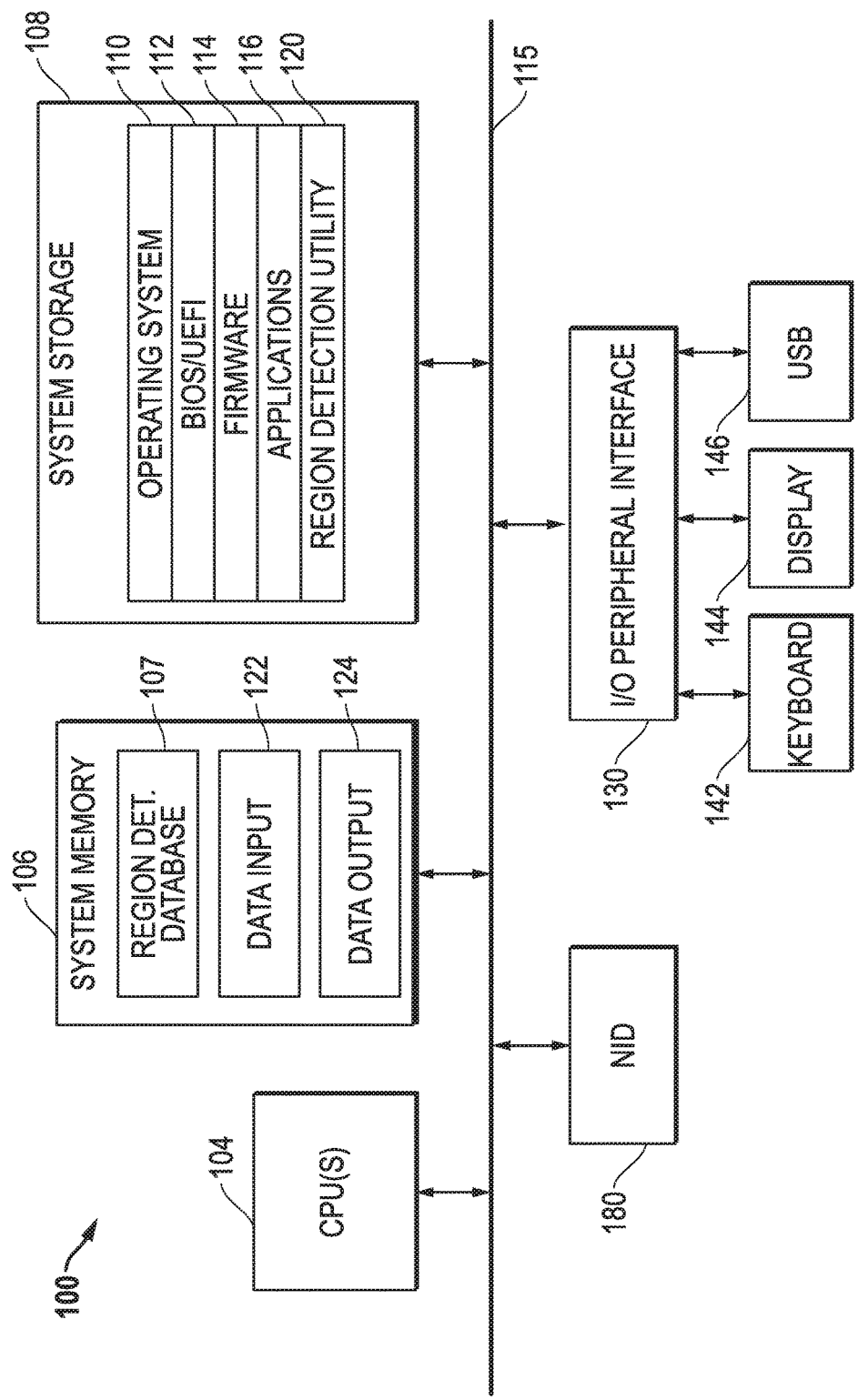
FIG. 1 illustrates in block diagram form a data processing system having power domain region detection technology according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a non-transitory computer-readable medium includes instructions that, when provided to and executed by a processor, cause the processor to receive a first placement of domain instances of an integrated circuit layout provided as a tile having a group of multiple power domain modules. The first placement of domain instances is scanned to identify instances associated with a preselected power specification. A heuristic is applied to the first placement of domain instances to form an observation area. The heuristic demarcates select instances to form the observation area. Each instance associated with the preselected power specification is identified in the observation area. A contiguous region of instances is formed from the select instances in the observation area. The first placement of domain instances in the integrated circuit layout is modified to provide revised placement for instances associated with the contiguous region of instances.

In another form, there is described a method for forming a select power domain region in an integrated circuit layout provided as a group of multiple power domain modules, the method receives an integrated circuit layout as a natural placement of instances associated with the group of multiple power domain modules. The group of multiple power domain modules is scanned to determine a ratio of select domain instances to total domain instances. The method further identifies when the ratio of select domain instances is greater than a predetermined ratio threshold. The group of multiple power domain modules is selectively partitioned to form an observation area in response to the ratio of select domain instances exceeding a predetermined threshold. The observation area is delineated as an area to form a contiguous region of instances that have a predetermined power specification. Instances within the observation area are selectively merged with adjacent instances in the observation area to form the contiguous region of instances. The contiguous region of instances forms the select power domain region that has instances associated with the predetermined power specification.

In yet another form, there is described a method for fabricating an integrated circuit. An integrated circuit layout, provided as a group of multiple power domain modules, is received. The group of multiple power domain modules is partitioned into an observation area of select instances. A ratio of select domain instances to total domain instances associated with the group of multiple power domain modules is determined. The method further identifies when the ratio of select domain instances is greater than a predetermined ratio threshold. In response to the ratio of select domain instances being greater than the predetermined ratio threshold, delineating the observation area as an area to form the contiguous region of instances which has instances associated with a predetermined power specification.

Instances within the observation area are selectively merged with adjacent instances in the observation area to form the contiguous regions of instances. The contiguous region of instances form the select power domain region having instances which are associated with the predetermined power specification. The integrated circuit layout is updated based on the selectively merged instances. The integrated circuit is fabricated according to the integrated circuit layout.

FIG. 1 illustrates in block diagram form a data processing system 100 according to some embodiments. Data processing system 100 includes generally a central processing unit (CPU) 104, a system memory 108, a system interconnect 115, a network interface device 180, an input/output (I/O) peripheral interface 130, a keyboard 142, a display 144, and a USB controller 146.

CPU 104 provides various buses and interfaces useful in modern computer systems. These interfaces include for example double data rate (DDRx) memory channels, and a Peripheral Component Interconnect Express (PCIe) root complex for connection to a PCIe link. In one embodiment, CPU 104 can be implemented with one or more CPU cores.

CPU 104 is connected to system memory 106 via system interconnect 115. System interconnect 115 can be interchangeably referred to as a system bus, in one or more embodiments. One or more databases are stored within system memory 106, for example, region detection database 107. Additionally, system memory includes storage for data input 122 and data output 124 associated with region detection utility 120.

Also, connected to system interconnect 115 is system storage 108. System storage 108 may be implemented as a hard disk drive or a solid-state drive. System storage 108 includes a plurality of software and/or firmware modules including operating system 110, basic input/output system/ unified extensible firmware interface (BIOS/UEFI) 112, other firmware (F/W) 114, application(s) 116, and region detection utility 120. Software and/or firmware modules within system storage 108 can be loaded into system memory 106 during operation of data processing system 100.

I/O peripheral interface 130 supports connection by, and processing of signals from, one or more connected input device(s) such as keyboard 142, display 144, and USB 146. I/O peripheral interface 130 also supports connection to and forwarding of output signals to one or more connected output devices. USB controller 146 optionally connects devices such as a keyboard, a mouse, a flash EEPROM port, and the like. Additionally, in one or more embodiments, I/O peripheral interface 130 provides access to one or more device interface(s), such as, without limitation, an optical reader, a card reader, a memory card port, and/or a high-definition multimedia interface (HDMI). A device interface(s) associated with I/O peripheral interface 130 can be utilized to enable data to be read from, or stored to, corresponding storage device(s), such as a compact disk (CD), digital video disk (DVD), flash drive, or flash memory card.

Data processing system 100 further includes network interface device (NID) 180. NID 180 enables data processing system 100 to communicate and/or interface with other devices, services, and components that are located external to data processing system 100. These devices, services, and components can interface with data processing system 100 via an external network (not shown), using one or more communication protocols. The network can be a local area network, wide area network, personal area network, and the like, and the connection to and/or between network and data processing system 100 can be wired or wireless or a combination thereof. For purposes of discussion, the network is indicated as a single collective component for simplicity. However, it is appreciated that the network can comprise one or more direct connections to other devices as well as a more complex set of interconnections as can exist within a wide area network, such as the Internet. Additional aspects of region detection utility 120 and functionality associated thereof, are presented within the description of FIGS. 2-7.

Figure 2:
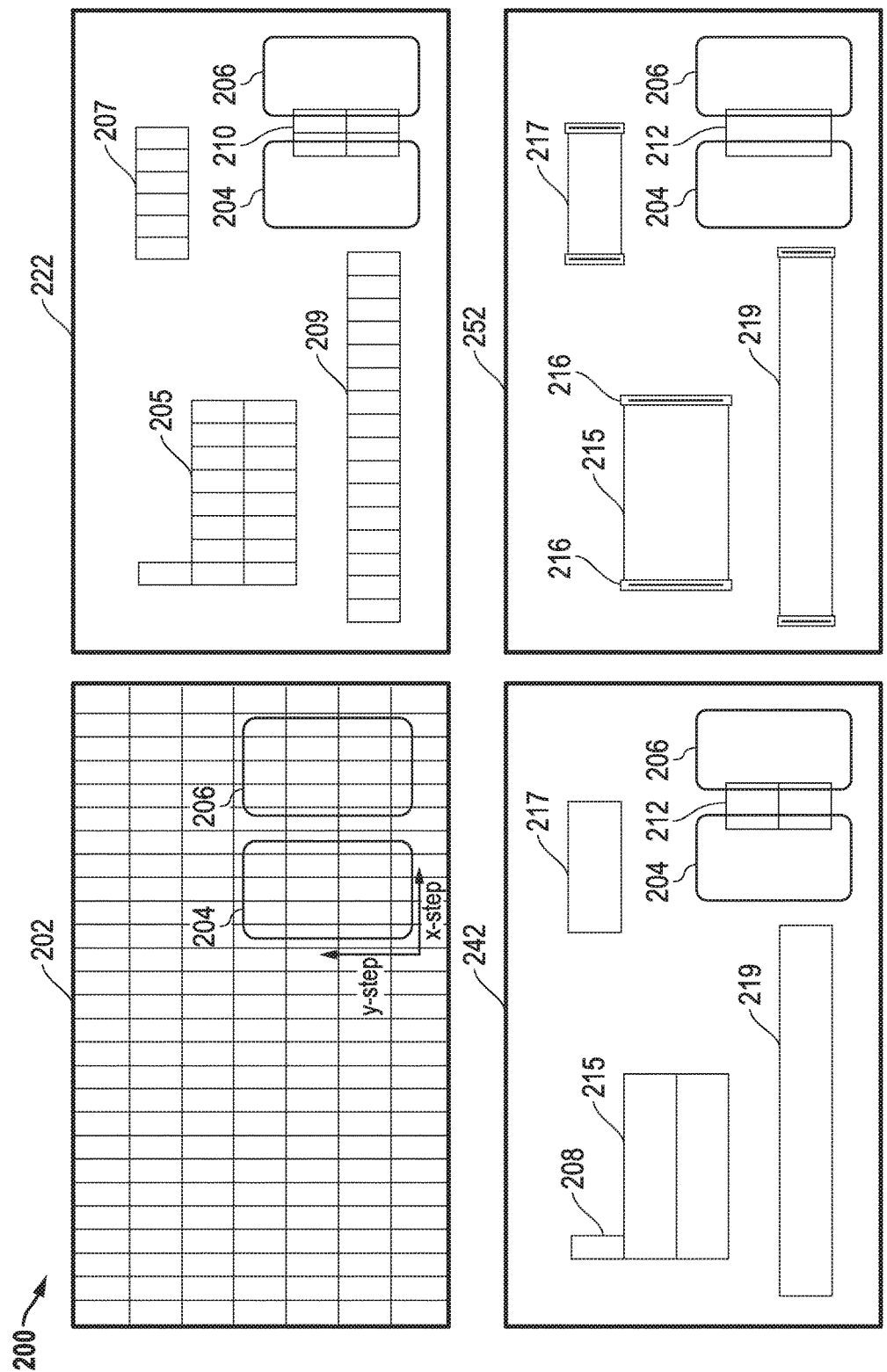
FIG. 2 is an illustration depicting a top view of an exemplary tile layout at different steps for selecting power domain regions of an integrated circuit SoC according to some embodiments.

FIG. 2 is an illustration depicting a top view of an exemplary tile layout 200 at different steps for selecting power domain regions of an integrated circuit SoC. Exemplary tile layout 200 includes an initial layout 202, a layout 222 after identifying a selected region of instances, a layout 242 after forming combined regions of instances, and a layout 252 having combined regions of instances with select breakers.

Initial layout 202 is a first placement of domain instances of an integrated circuit layout. Each instance is associated with one of a set of two power domains. Also, superimposed on the illustration of initial layout 202 are a scan window 204 and a scan window 206. Scan window 204 and scan window 206 are utilized for scanning select regions of layout 222. Region detection utility 120 uses scan windows 204 and 206 to scan the group of multiple power domain modules in a predetermined pattern and identify an associated power domain. The predetermined pattern is an x-step and y-step pattern having preselected x-step and y-step dimensions. The step size can be dynamically determined or user defined. During a scan of initial layout 202, region detection utility 120 determines a ratio of instances on a particular power domain to total instances within each scan window 204 and 206 to identify instances associated with a preselected power specification to form one or more observation areas. Region detection utility 120 designates each observation area as an area to form the combined region of contiguous instances associated with the selected power specification.

Layout 222 includes observation areas 205, 207, 209, and 210. Observation areas 205, 207, 209, and 210 are examples of areas having a ratio of select domain instances to total instances that exceeds a predetermined threshold.

Layout 242 includes an adjacent instance area 208, and contiguous instance areas 212, 215, 217, and 219. Each contiguous area represents a selected group of adjacent instances in the same power domain.

Layout 252 includes breaker cells 216 and contiguous instance areas 212, 215, 217, and 219. When the selected power specification is a continuous power supply and contiguous instance areas 215, 217, and 219 are in a multiple (or nested) power domain region, region detection utility 120 inserts one or more breaker cells 216 at one or more sides of contiguous instance areas 215, 217, and 219 to isolate select areas in the contiguous region of instances from a preselected power supply during subsequent place-and-route steps. In one example, region detection utility 120 identifies a pre-gated power domain instance from among a multiple power domain region, and executes inserting one or more breaker cells to isolate the pre-gated power domain instance from a gated power supply.

In operation, a user creates a design with a preselected power specification. For example, the preselected power specification is one of gated power and pre-gated power. A place-and-route tool physically lays out the circuitry in the netlist in a set of tiles, each corresponding to a portion of the IC layout. Region detection utility 120 receives a first placement of domain instances, for example layout 202, of an integrated circuit tile from the place-and-route utility. Region detection utility 120 scans the instances using an x-step and y-step scan window to identify the power domain with which the instance is associated, in which each instance may include further nested circuitry from the other power domain. Region detection utility 120 forms observation areas that identify contiguous instances associated with a particular power specification. In the particular example shown in FIG. 2, region detection utility 120 uses scan window 204 and scan window 206 to scan initial layout 202 in an x-step, y-step pattern. For example, in 14 nanometer (nm) technology, region detection utility 120 uses a 10×20 micrometer scan window. For technology yielding smaller features a finer scan window may be used. In one embodiment, using a finer x-step value yields a more precise correlation of the selected power region to the natural cluster instances. As region detection utility 120 scans through the first placement of instances in initial layout 202, region detection utility 120 applies a heuristic to the first placement of domain instances to form observation areas 205, 207, 209, and 210. The heuristic selects observation regions 205, 207, 209, and 210 by determining a ratio of select power domain instances to total instances that are associated with the first placement of domain instances in the group of multiple power domain modules. The select power domain instances are circuitry within the integrated circuit layout that are associated with the preselected power specification. In response to the ratio of select power domain instances to total instances exceeding a predetermined threshold within the perimeter of scan window 204 and/or 206, region detection utility 12 designates the area within the perimeter as observation area 205, 207, 209, and 210, as an area from which to form select groups of contiguous instance areas 212, 215, 217, and 219.

From among the demarcated select instances in observation areas 205, 207, 209, and 210, region detection utility 120 dynamically identifies each instance which is associated with the preselected power specification. Region detection utility 120 identifies a vertical edge of observation areas 205, 207, 209, and 210. In response to the vertical edge overlapping with a fixed component (i.e. tapcell, endcap, power gates, upper power stripes, etc), region detection utility 120 avoids overlapping the fixed component by re-forming the vertical edge of the observation area. Region detection utility 120 forms contiguous instance areas 212, 215, 217, 219 from observation areas 205, 207, 209, and 210. To form contiguous instance areas 212, 215, 217, 219, region detection utility 120 merges an instance within one of the observation areas 205, 207, 209, and 210 with an adjacent instance in the respective observation area. In response to adjacent instance 208 having area less than a predetermined size threshold, region detection utility 120 removes adjacent instance 208 from contiguous instance areas 212, 215, 217, 219. Region detection utility 120 modifies the first placement of domain instances in the integrated circuit layout to provide revised placement for instances associated with the contiguous instance areas 212, 215, 217, 219. For example, the modified information is provided to the place-and-route tool.

In one example, the first placement of instances of the integrated circuit layout is a natural placement of instances in the group of multiple power domain modules. The selected or targeted power domain is the pre-gated power domain. Region detection utility 120 executes scan window 204 and/or 206 to scan the first placement of instances in the multiple power domain modules (layout 202) in a left to right and bottom to top pattern. Additionally, the multiple power domain modules are scanned in an x-step and y-step pattern to selectively form observation area 205, 207, 209, and 210. The selection of instances is based on detected logical connections that specify the instances in initial layout 202 as a pre-gated power instance requiring continuous power or a gated poser instance requiring gated (on/off) power.

In one embodiment, the main rail is the power-gated rail. If a number of pre-gated instances in selected region of instances 222 is greater than a threshold number, region detection utility 120 demarcates the main rail as a pre-gated rail instead of the power-gated rail within the region. Changing the rail to a pre-gated rail reduces movement of cells and potentially eliminates the need to cluster instances (in subsequent steps) that are located nearby or within selected region of instances 222.

In some embodiments, region detection utility 120 inserts one or more breaker cells 216 around contiguous instance areas 215, 217, and 219 and or user defined components to isolate select instances and components from a specified power supply. For example, when the preselected power specification is a continuous power specification, region detection utility 120 inserts one or more breaker cells to isolate select instances in the contiguous instance areas 212, 215, 217, 219 from a gated power supply. Therefore, region detection utility 120 modifies the first placement of domain instances in the integrated circuit layout to provide revised placement for instances associated with the contiguous instance areas 212, 215, 217, 219 and the one or more breaker cells 216.

In still another embodiment, region detection utility 120 receives identification of one or more cell types and/or components to avoid when forming observation area 205, 207, 209, and 210 within observation area 222. Region detection utility 120 dynamically identifies and/or receives user defined input of cell types and/or components to avoid when forming observation area 205, 207, 209, and 210. Contiguous instance areas 212, 215, 217, and 219 are formed or merged around the cell types and/or components.

Figure 3:
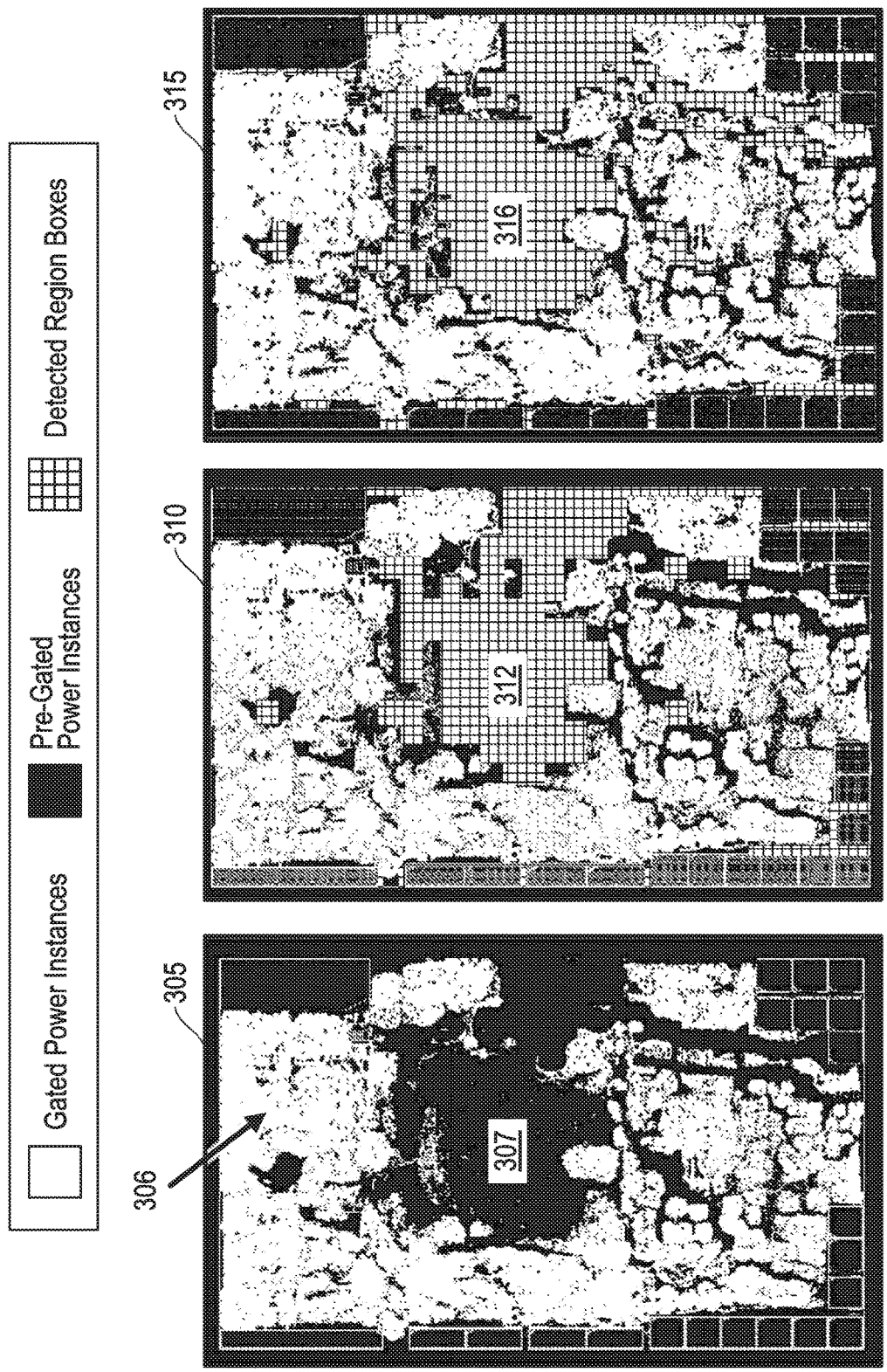
FIG. 3 is a top view of cell placement and routing in an exemplary integrated circuit tile to form an integrated circuit layout according to some embodiments.

FIG. 3 is a top view of cell placement and routing in an exemplary integrated circuit tile to form an integrated circuit layout. FIG. 3 includes integrated circuit tile 305, modified integrated circuit tile 310, and modified integrated circuit tile 315.

Integrated circuit tile 305 is a group of multiple power domain modules nested together to form the first placement of instances of an integrated circuit layout. Integrated circuit tile 305 includes instances 306 which are gated power domain instances, and instances 307 which are pre-gated power domain instances.

Modified integrated circuit tile 310 includes region boxes 312. Region boxes 312 identify the domain region associated with the pre-gated power specification when the pre-gated power specification has a determined ratio of pre-gated power domain instances 307 to total instances (306 and 307) that exceed a predetermined threshold within the first placement of instances in integrated circuit tile 305. Region boxes 312 are a result of scanning integrated circuit tile 305 with an x-step and y-step pattern having a first set of selected dimensions.

Modified integrated circuit tile 315 includes region boxes 316. Region boxes 316 identify the domain region associated with the pre-gated power specification when the pre-gated power specification has a determined ratio of pre-gated power domain instances 307 to total instances (306 and 307) that exceed a predetermined threshold within the first placement of instances within integrated circuit tile 305.

Region boxes 316 are a result of scanning integrated circuit tile 305 with an x-step and y-step pattern having a second set of selected dimensions.

In one example, the integrated circuit layout of integrated circuit tile 305 is received at data processing system 100. The natural placement of domain instances of integrated circuit tile 305 intrinsically has multiple domain logics nested together in the same area. The ratio of pre-gated power domain instances to total domain instances is 70%, therefore the pre-gated power domain logic is more prevalent than the gated power domain logic. There are two forms of power rails associated with the integrated circuit layout of integrated tile 305, a gated power rail (on/off power) and a pre-gated power rail (always on power). By nature, the placement of instances 307 is scattered throughout the tile, and potentially in areas of integrated circuit tile 305 that cannot be powered by pre-gated rail. Region detection utility 120 (FIG. 1) partitions modules associated with integrated circuit tile 305 based on a selected dimension of 30-micrometer by 30-micrometer for the x-step and y-step pattern. The 30-micrometer by 30-micrometer scan window yields an observation area having instances associated with region boxes 312. A separate scan is executed on the natural placement of domain instances of integrated circuit tile 305 to compare the results of selecting a finer dimension for the x-step and y-step. Selected dimensions of the x-step and y-step pattern are decreased to provide a 10-micrometer by 20-micrometer scan window. The resulting region boxes 316 provide regions with instances that correlate more efficiently with the natural placement of instances received as the first placement of instances for integrated circuit tile 305.

In another example, a subsequent scan is executed on region boxes 316. At the initiation of a subsequent scan, region detection utility 120 detects and preserves, at least in part, the current placement of instances provided by region boxes 316. Preserving the current placement of instances, prior to the subsequent scan, minimizes the movement of cells in the integrated circuit tile during subsequent place and route steps for forming a final integrated circuit layout.

In still another embodiment, region detection utility 120 executes auto region detection to modify the domain region within integrated circuit tile 305, where integrated circuit tile 305 is the design area. In this example instances 306 are the majority instances and instances 307 are minority instances. When region detection utility 120 is executed the auto-regions formed allow clusters from an opposite power domain to exist within the formed region(s). Therefore, the contiguous region of instances is contiguous in part as the power domain instances from an opposite power domain are permitted to form within the region.

Figure 4:
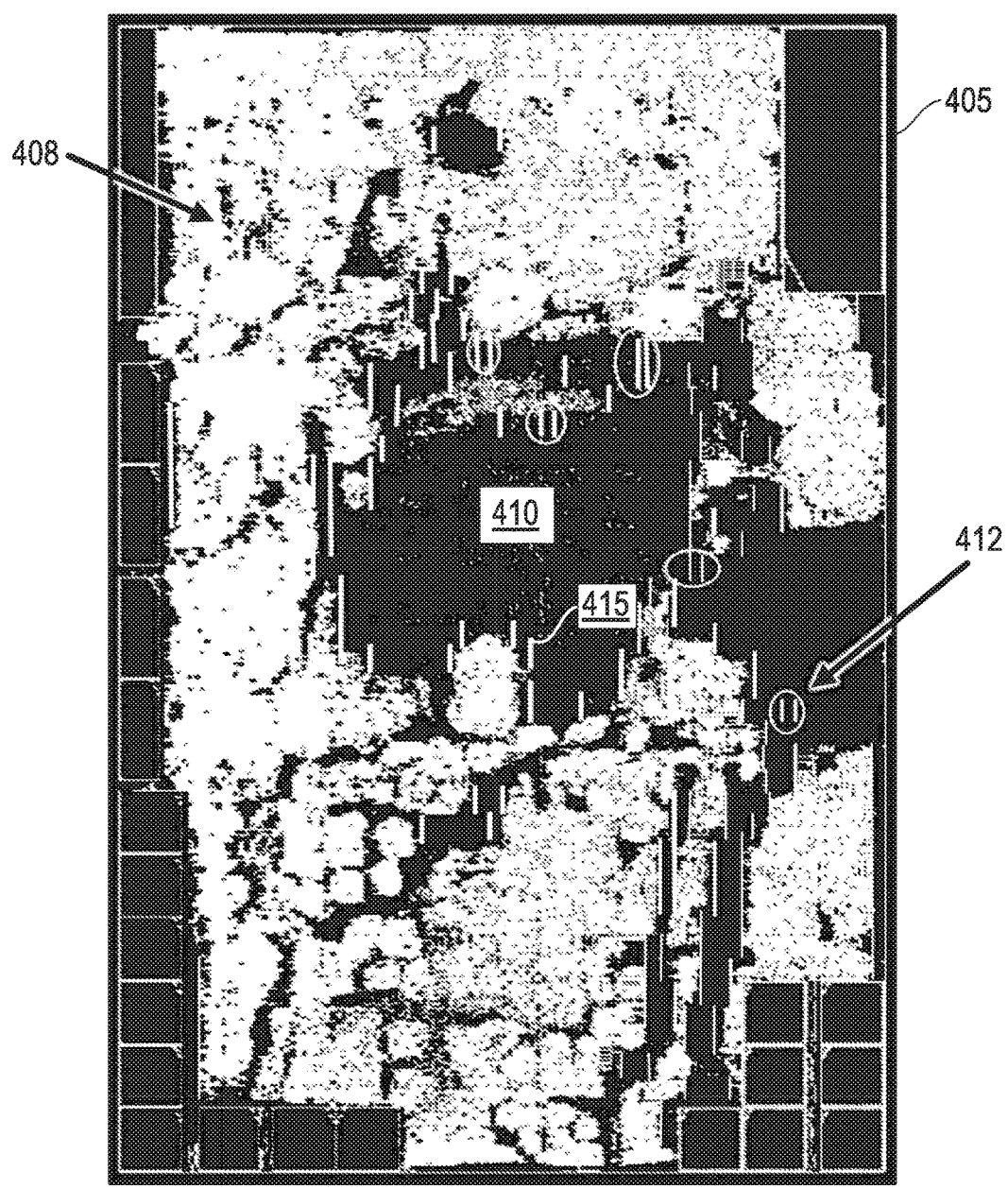
FIG. 4 is a top view illustrating the formation of contiguous regions during cell placement and routing for an integrated circuit layout according to some embodiments.

FIG. 4 is a top view illustrating the formation of contiguous regions during cell placement and routing for an integrated circuit layout. Integrated circuit tile 405, of FIG. 4, includes gated power domain instances 408, pre-gated power domain instances 410, pre-gated power domain instances 412 and pre-gated power domain instances 415.

In one embodiment, integrated circuit tile 405 provides an integrated circuit layout having instances merged utilizing region detection utility 120. A subsequent analysis is performed on the integrated circuit layout of integrated circuit tile 405 to form more continuous regions among pre-gated power domain instances 410. During the subsequent analysis, region detection utility 120 performs a check on the merged regions to avoid leaving a "slither" of gated power domain instances, where the slither is approximately equivalent to the distance of x-step between adjacent pre-gated power domain instances. Region detection utility 120 determines if the distance between adjacent pre-gated power domain instances is the distance of x-step or less. In response to the distance between adjacent pre-gated power domain instances being approximately x-step or less, region detection utility 120 merges the adjacent pre-gated power domain instances. For example, pre-gated power domain instances 412 are x-step distance apart. Region detection utility 120 merges pre-gated power domain instances 412. In response to a distance remaining in between pre-gated power domain instances that is greater than the distance of x-step, for example pre-gated power domain instance 415 and an adjacent pre-gated power domain instance, region detection utility 120 defers modification of the region to a clustering tool.

Fine tuning the merged regions of integrated circuit tile 405 avoids and/or eliminates the need to cluster instances in one or more regions, thereby minimizing movement of the integrated cells. The selected power domain regions are determined based, in part, on the natural placement of cells in the integrated circuit tile. Minimizing and/or avoiding clustering of integrated circuit cells minimizes cell movement, increases power routing efficiency, maintains a power intent correct integrated circuit layout, and enables large—free formed power domains to be nested in an integrated circuit tile.

FIG. 5 illustrates a table 500 depicting results for detecting contiguous cell regions based, in part, on the natural placement of domain instances. Table 500 has a first column listing the categories analyzed to obtain the results. The categories analyzed include auto detection region run time (minutes) 510, cluster run time (minutes) 512, number of naturally clustered (instances) 514, second series of clustering 516, total clustered instances 518, cluster cells moved 520, and clustered instance max moved 522. The second column of table 500 includes default method 504. The third column of table 500 includes detection region method 506. The fourth column of table 500 includes conclusion 508.

In the example of table 500, the natural placement instances in an integrated circuit tile is analyzed using two methods. The first method is the traditional method of clustering. The results from the traditional method of clustering are provided in the column of default method 504. The second method of analysis is utilizing region detection utility 120. The results from the second method of analysis is provided in the column of detection region method 506.

During the traditional method of clustering, for example, utilizing an electronic design automation (EDA) tool, zero minutes are utilized for auto detection. The cluster run time 512 is a total of 31 minutes. During the 31 minutes of runtime 81,398 naturally clustered instances 514 are formed using the EDA tool. During a second round of clustering using the EDA tool, 75,326 more instances are clustered. Total number of clustered instances 518 yields a result of 156,724. Cluster instance max moved 522 (at a time) are 68.076.

During the region detection method of clustering, utilizing region detection utility 120, five minutes are utilized for auto detection run time. Auto detection, utilizing region detection utility 120, is followed by 25 minutes of clustering (utilizing an EDA tool), for a total initial analysis time of 30 minutes. Number of naturally clustered instances 514 resulting from the 5 minutes of auto detect region run time and 25 minutes of clustering using the EDA tool results in 23,952 naturally clustered instances. During a second round of clustering using the EDA tool, only 38,496 more instances are clustered. Total number of clustered instances 518 for the auto detection method yields a result of 62,448. Cluster instance max moved 522 (at a time) are 21.69.

Utilizing the region detection utility 120 reduces total number of clustered instances 518 by 60%. Clustered cells moved are reduced by 50%. Cluster instance max moved 522 is reduced by 70%. Clustering is utilized to reduce movement of cells in an integrated circuit design; however, region detection utility 120 provides logic that reduces the movement of cells at least 60% better than the traditional clustering method alone as provided in actual results of table 500. Additionally, utilizing the traditional method of clustering alone in this example yielded an un-routable integrated circuit layout. Implementing the region detection method along with the traditional clustering method yielded a routable, power intent correct integrated circuit layout.

Figure 6:
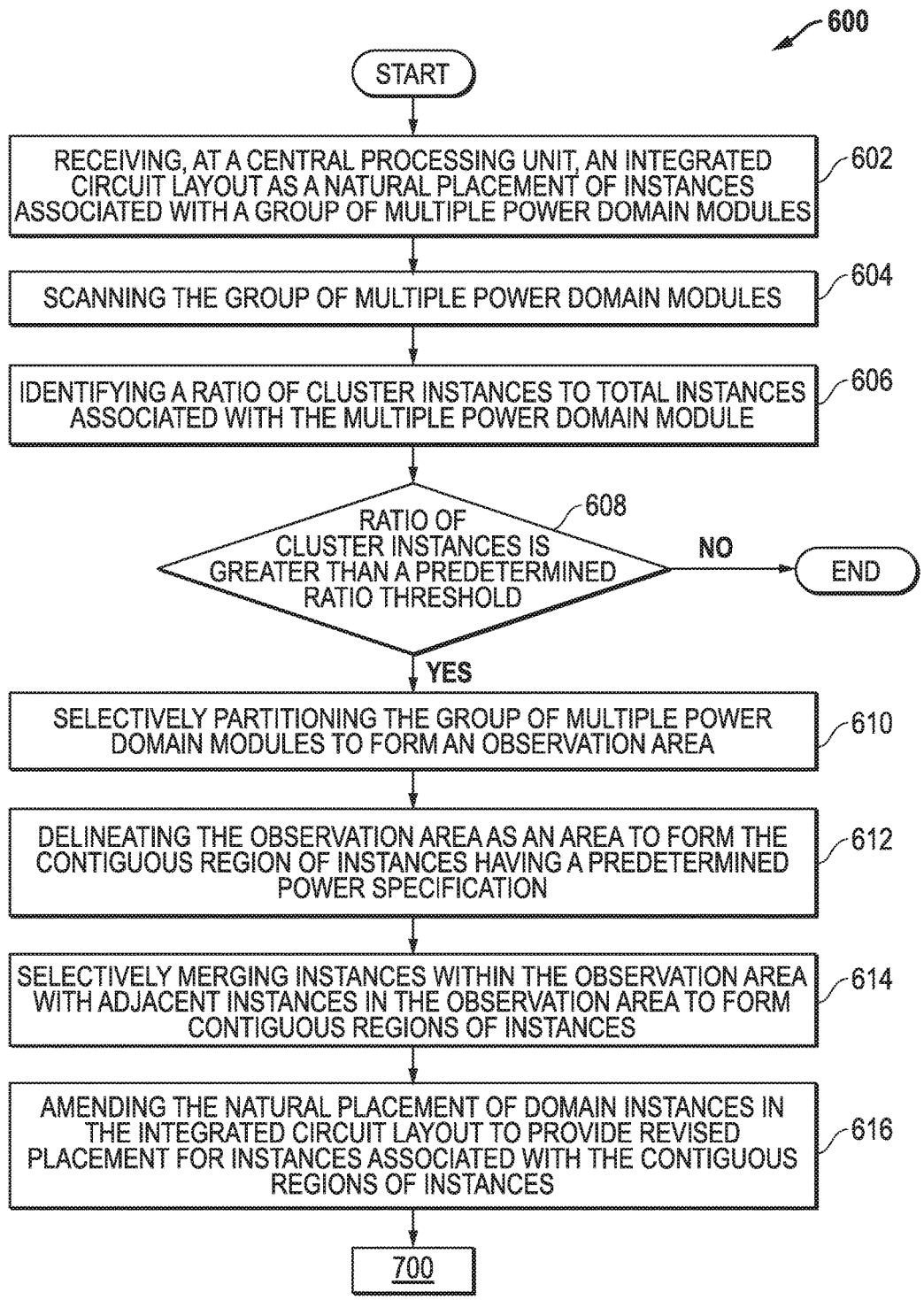
FIG. 6 illustrates a flow diagram of a method of providing revised placement for domain instances in an integrated circuit layout according to some embodiments.

FIG. 6 illustrates a flow diagram of a method of providing revised placement for domain instances in an integrated circuit layout, and that may be used by region detection utility 120 of FIG. 1. At block 602, CPU (104) receives an integrated circuit layout as a natural placement of domain instances associated with a group of multiple power domain modules. Region detection utility 120 scans the group of multiple power domain modules to determine a ratio of select domain instances to total domain instances at block 604. At block 606, region detection utility 120 identifies when the ratio of select domain instances is greater than a predetermined ratio threshold. A determination is made, at block 608, whether the ratio of cluster instances is greater than a predetermined ratio threshold. In response to the ratio of cluster instances not being greater than the predetermined ratio threshold, the process ends. In response to the ratio of cluster instances being greater than a predetermined ratio threshold the process continues to block 610. At block 610 the group of multiple power domain modules are selectively partitioned to form an observation area of select domain instances. Region detection utility 120 delineates the observation area as an area to form a contiguous region of instances that has a predetermined power specification at block 612. At block 614 region detection utility 120 executes selectively merging instances within the observation area with adjacent instances in the observation area to form the contiguous region(s) of instances. The contiguous region(s) of instances form the select power domain region having instances associated with the preselected power specification. The natural placement of domain instances in the integrated circuit layout is amended, at block 616, to provide revised placement for instances associated with the contiguous regions of instances. The process continues to block 700.

Figure 7:
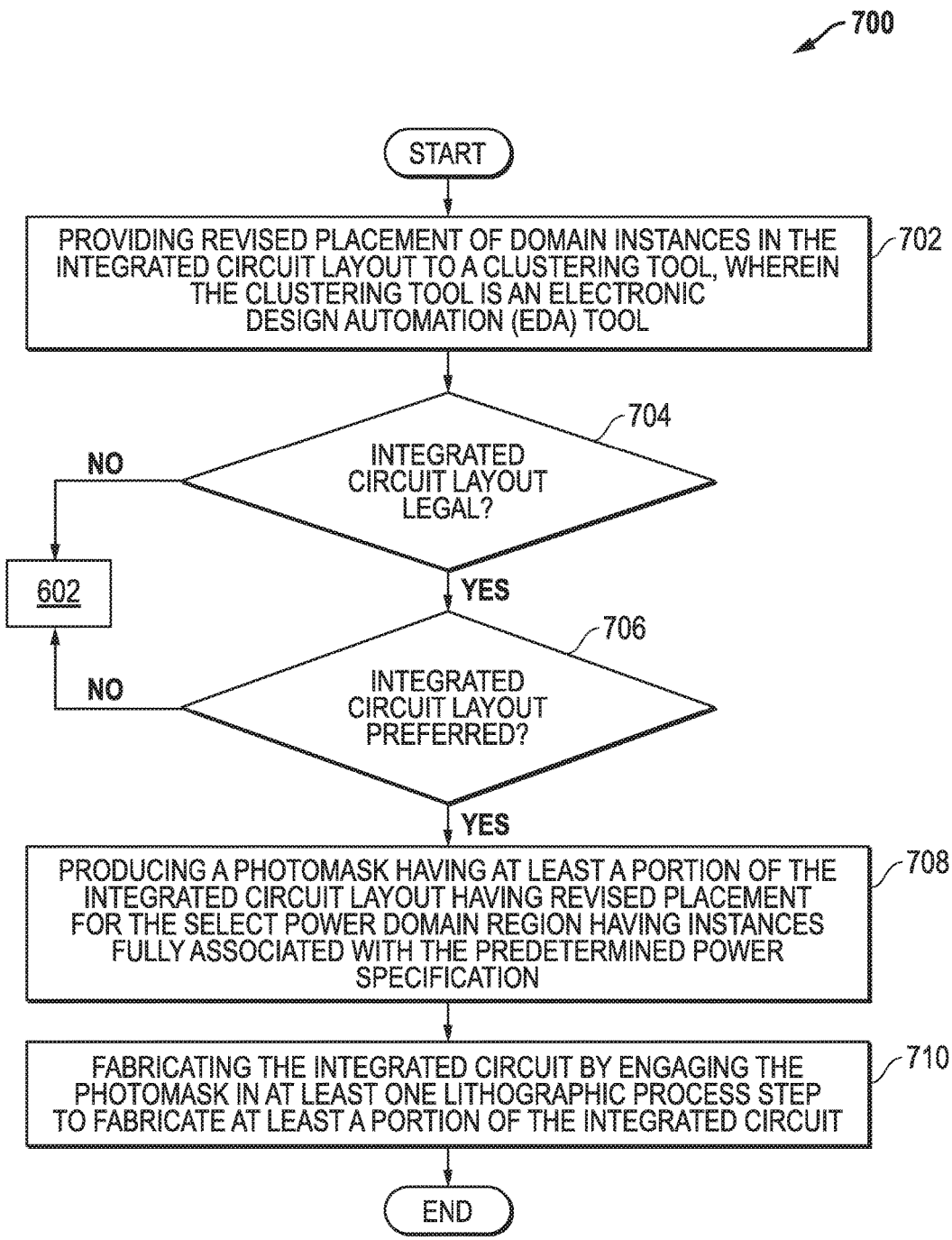
FIG. 7 illustrates a flow diagram of a method of fabricating an integrated circuit having a revised placement of domain instances according to some embodiments.

FIG. 7 illustrates a flow diagram of a method of fabricating an integrated circuit having a revised placement of domain instances, in part and/or in whole, by region detection utility 120. The revised placement for the select power domain region having instances associated with the preselected power specification is provided to a clustering tool for clustering and legalization of the integrated circuit design (e.g. EDA tool) at block 702. A determination is made at block 704 whether the integrated circuit resulting from the revised placement of domain instances is legal. In response to the revised placement being legal, the method continues to determination block 706. In response to the revised placement not being legal the process returns to block 602 of method 600. A determination is made, at block 706, whether the integrated circuit layout is a preferred layout. In response to the integrated circuit layout not being a preferred layout, the process returns to block 602 of method 600. In response to the integrated circuit layout being a preferred layout, the process continues to block 708. At block 708 a photomask is produced having at least a portion of the integrated circuit layout having revised placement for the select power domain region with instances that are associated with the preselected power specification. The integrated circuit is fabricated by engaging the photomask in at least one lithographic process step to fabricate at least a portion of the integrated circuit at block 710. The process concludes at the end block.

Data processing system 100 or any of its components may be implemented with various combinations of hardware and software. Some or all of these components or the method illustrated in FIG. 6 and FIG. 7 may be governed by instructions that are stored in a computer readable storage medium and that are executed by at least one processor. Each of the operations shown in FIG. 6 and FIG. 7 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, data processing system 100 of FIG. 1 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

Accordingly, it is intended by the appended claims to cover all modifications of the disclosed embodiments that fall within the scope of the disclosed embodiments.

What is claimed is:

1. A non-transitory computer-readable medium comprising instructions that, when provided to and executed by a processor, cause the processor to:

receive a first placement of domain instances of an integrated circuit layout provided as a tile having a group of multiple power domain modules;

scanning the first placement of domain instances to identify domain instances associated with a preselected power specification;

apply a heuristic to the first placement of domain instances to form an observation area, wherein the heuristic demarcates select domain instances to form the observation area;

dynamically identify each domain instance in the observation area which is associated with the preselected power specification;

form a contiguous region of domain instances from the select domain instances in the observation area; and modify the first placement of domain instances in the integrated circuit layout to provide a revised placement for domain instances associated with the contiguous region of domain instances.

2. The non-transitory computer-readable medium of claim 1, wherein the heuristic comprises:

determining a ratio of select power domain instances to total domain instances associated with the first placement of domain instances in the group of multiple power domain modules; and in response to the ratio of select power domain instances to total instances exceeding a predetermined threshold, designate the observation area as an area from which to form the contiguous region of domain instances.

3. The non-transitory computer-readable medium of claim 1, further comprising:

scanning the first placement of domain instances in a left to right and bottom to top pattern;

merging a domain instance within the observation area with an adjacent domain instance in the observation area to form the contiguous region of domain instances; and in response to the adjacent domain instance having an area less than a predetermined threshold, removing the adjacent domain instance from contiguous region of domain instances.

4. The non-transitory computer-readable medium of claim 1, further comprising:

identifying a vertical edge of the observation area; and in response to the vertical edge overlapping with a fixed component, re-forming the vertical edge to avoid overlapping the fixed component.

5. The non-transitory computer-readable medium of claim 1, further comprising scanning the group of multiple power domain modules in an x-step and y-step pattern to form the observation area, wherein each dimension of the x-step and y-step pattern is a selected dimension.

6. The non-transitory computer-readable medium of claim 1, further comprising when the preselected power specification is a continuous power specification, inserting one or more breaker cells to isolate select areas in the contiguous region of domain instances from a gated power supply.

7. The non-transitory computer-readable medium of claim 1, wherein the first placement of domain instances of the integrated circuit layout is a natural placement of domain instances in the group of multiple power domain modules.

8. The non-transitory computer-readable medium of claim 1, further comprising updating the first placement of domain instances of the integrated circuit layout to include the contiguous region of domain instances and one or more breaker cells associated with the contiguous region of domain instances.

9. The non-transitory computer-readable medium of claim 1, further comprising receiving an input that identifies one or more cell types to avoid when forming the observation area.

10. A method for forming a select power domain region in an integrated circuit layout provided as a group of multiple power domain modules, the method comprising:

receiving an integrated circuit layout as a natural placement of domain instances associated with the group of multiple power domain modules;

scanning the group of multiple power domain modules to determine a ratio of select domain instances to total domain instances;

identifying when the ratio of select domain instances is greater than a predetermined ratio threshold;

selectively partitioning the group of multiple power domain modules to form an observation area in response to the ratio of select domain instances exceeding a predetermined threshold;

delineating the observation area as an area to form a contiguous region of domain instances having a preselected power specification; and selectively merging domain instances within the observation area with adjacent domain instances in the observation area to form the contiguous region of domain instances, wherein the contiguous region of domain instances forms the select power domain region having domain instances associated with the preselected power specification.

11. The method of claim 10, wherein selectively merging domain instances further comprises:

identifying adjacent domain instances having a size threshold that is less than a predetermined size threshold; and in response to the adjacent domain instances having the size threshold that is less than a predetermined size threshold, removing the adjacent domain instances from the select power domain region.

12. The method of claim 10, further comprising scanning the group of multiple power domain modules in a predetermined pattern to form the observation area, wherein the predetermined pattern is an x-step and y-step pattern having a preselected x-step and y-step dimension.

13. The method of claim 10, further comprising:

identifying a vertical edge of the select power domain region; and in response to the vertical edge overlapping with a fixed component, re-forming the vertical edge to avoid overlapping the fixed component.

14. The method of claim 10, further comprising identifying a pre-gated power domain instance from among a multiple power domain region, and inserting one or more breaker cells to isolate the pre-gated power domain instance from a gated power supply.

15. The method of claim 10, wherein selectively merging further comprises scanning the group of multiple power domain modules in a left to right and bottom to top pattern to form the observation area.

16. The method of claim 10, further comprises:

receiving identification of a cell type associated with the group of multiple power domain modules to avoid merging when forming the observation area; and identifying the cell type within the group of multiple power domain modules.

17. The method of claim 16, further comprising forming a breaker cell around the cell type to isolate the cell type from a preselected power supply, in response to identification of the cell type within the group of multiple power domain modules.

18. The method of claim 10, further comprising:

receiving, at a central processing unit, an integrated circuit layout as a natural placement of domain instances associated with the group of multiple power domain modules;

selectively partitioning the natural placement of domain instances; and amending the natural placement of domain instances in the integrated circuit layout to provide revised placement for domain instances associated with the contiguous regions of domain instances.

19. The method of claim 10, further comprising providing a revised placement of domain instances in the integrated circuit layout to a clustering tool, wherein the clustering tool is an EDA tool.

20. A method for fabricating an integrated circuit, the method comprising:

receiving an integrated circuit layout provided as a group of multiple power domain modules, partitioning the group of multiple power domain modules into an observation area of select domain instances;

determining a ratio of select domain instances to total domain instances associated with the group of multiple power domain modules;

identifying when the ratio of select domain instances is greater than a predetermined ratio threshold;

in response to the ratio of select domain instances being greater than the predetermined ratio threshold, delineating an observation area as an area to form a contiguous regions of domain instances having domain instances associated with a preselected power specification;

selectively merging domain instances within the observation area with adjacent domain instances in the observation area to form the contiguous regions of domain instances, wherein the contiguous region of domain instances form a select power domain region having domain instances associated with the preselected power specification;

updating the integrated circuit layout based on the selectively merging; and fabricating the integrated circuit according to the integrated circuit layout.

* * * * *